(12) United States Patent
Kwon et al.

(10) Patent No.: US 11,429,239 B2
(45) Date of Patent: Aug. 30, 2022

(54) TOUCH SENSOR AND IMAGE DISPLAY DEVICE INCLUDING THE SAME

(71) Applicant: DONGWOO FINE-CHEM CO., LTD., Jeollabuk-do (KR)

(72) Inventors: Do Hyoung Kwon, Gyeonggi-do (KR); Ji Yeon Kim, Gyeonggi-do (KR); Ki Deok Lee, Gyeonggi-do (KR); Cheol Hun Lee, Gyeonggi-do (KR)

(73) Assignee: DONGWOO FINE-CHEM CO., LTD., Jeollabuk-Do (KR)

( * ) Notice: Subject to any disclaimer, the term of this patent is extended or adjusted under 35 U.S.C. 154(b) by 0 days.

(21) Appl. No.: 17/128,478

(22) Filed: Dec. 21, 2020

(65) Prior Publication Data

US 2021/0191572 A1    Jun. 24, 2021

(30) Foreign Application Priority Data

Dec. 24, 2019 (KR) .......................... 10-2019-0173843

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04103* (2013.01); *G06F 2203/04111* (2013.01); *G06F 2203/04112* (2013.01)

(58) Field of Classification Search
None
See application file for complete search history.

(56) References Cited

U.S. PATENT DOCUMENTS

2018/0039360 A1* 2/2018 Akimoto ............... G06F 3/0446
2020/0133438 A1* 4/2020 Kim ...................... G06F 3/0448

FOREIGN PATENT DOCUMENTS

WO    WO 2013/063176 A1    5/2013

* cited by examiner

*Primary Examiner* — Brian M Butcher
(74) *Attorney, Agent, or Firm* — The PL Law Group, PLLC

(57) ABSTRACT

A touch sensor according to an embodiment of the present invention includes a base layer, a bridge electrode disposed on a top surface of the base layer, auxiliary electrodes disposed around the bridge electrode to be physically spaced apart from the bridge electrode, first sensing electrodes electrically connected to each other via the bridge electrode, and second sensing electrodes electrically separated from the first sensing electrodes and arranged in a direction different from an arrangement direction of the first sensing electrodes. A resistance may be decreased and a visual recognition of the bridge electrode may be suppressed using the auxiliary electrodes.

16 Claims, 10 Drawing Sheets

TOUCH SENSOR AND IMAGE DISPLAY DEVICE INCLUDING THE SAME

CROSS-REFERENCE TO RELATED APPLICATION AND CLAIM OF PRIORITY

This application claims priority to Korean Patent Applications No. 10-2019-0173843 filed on Dec. 24, 2019 in the Korean Intellectual Property Office (KIPO), the entire disclosure of which is incorporated by reference herein.

BACKGROUND

1. Field

The present invention relates to a touch sensor and an image display device including the same. More particularly, the present invention relates to a touch sensor including a patterned sensing electrode and an image display device including the same.

2. Description of the Related Art

As information technologies are being developed, various demands in display devices having thinner dimension, light-weight, high efficiency in power consumption, etc., are increasing. The display device may include a flat panel display device such as a liquid crystal display (LCD) device, a plasma display panel (PDP) device, an electro-luminescent display device, an organic light emitting diode (OLED) display device, etc.

A touch panel or a touch sensor capable of inputting a user's direction by selecting an instruction displayed on a screen with a finger or an inputting tool is also developed. The touch panel or the touch sensor may be combined with the display device so that display and information input functions may be implemented in one electronic device.

In the touch sensor, sensing electrodes formed of a conductive material such as a metal for a touch sensing may be arranged on a substrate. However, when the touch sensor is inserted in the display device, an image quality implemented from the image display device may be degraded by the sensing electrodes. For example, the sensing electrodes may be visually recognized by the user to disturb the image.

Further, a low channel resistance through sensing electrodes may be advantageous for implementing a touch sensing of high resolution and high sensitivity. Thus, construction of the sensing electrodes having improved optical properties for enhancing the image quality and electrical properties for the touch sensing is required.

For example, as disclosed in Korean Patent Application Publication No. 2014-0092366, various image display devices combined with a touch screen panel including a touch sensor has been developed recently. However, the touch sensor or the touch panel having improved optical property is continuously demanded as described above.

SUMMARY

According to an aspect of the present invention, there is provided a touch sensor having improved optical property and electrical reliability.

According to an aspect of the present invention, there is provided an image display device including the touch sensor.

The above aspects of the present inventive concepts will be achieved by the following features or constructions:

(1) A touch sensor, including: a base layer; a bridge electrode disposed on a top surface of the base layer; auxiliary electrodes disposed around the bridge electrode to be physically spaced apart from the bridge electrode; first sensing electrodes electrically connected to each other via the bridge electrode; and second sensing electrodes electrically separated from the first sensing electrodes and arranged in a direction different from an arrangement direction of the first sensing electrodes.

(2) The touch sensor according to the above (1), wherein the auxiliary electrodes include first auxiliary electrodes and second auxiliary electrodes, wherein the first sensing electrodes are superimposed over the first auxiliary electrodes and the second sensing electrodes are superimposed over the second auxiliary electrodes in a planar view.

(3) The touch sensor according to the above (2), wherein the first sensing electrodes include first etched regions therein, and the second sensing electrodes include second etched regions therein.

(4) The touch sensor according to the above (3), wherein the auxiliary electrodes have a mesh shape including unit cells assembled therein.

(5) The touch sensor according to the above (4), wherein the unit cells of the first auxiliary electrodes are arranged to be offset from the first etched regions in the planar view, and the unit cells of the second auxiliary electrodes are arranged to be offset from the second etched regions in the planar view.

(6) The touch sensor according to the above (4), further including separation electrodes arranged between the first auxiliary electrode and the second auxiliary electrode neighboring each other.

(7) The touch sensor according to the above (6), wherein each of the separation electrodes has a fragmented shape from one side of each of the unit cells.

(8) The touch sensor according to the above (2), wherein the first auxiliary electrodes physically contact the first sensing electrodes, and the second auxiliary electrodes physically contact the second sensing electrodes.

(9) The touch sensor according to the above (1), wherein the bridge electrode has a curved line shape or a wavy shape.

(10) The touch sensor according to the above (9), wherein the auxiliary electrodes have a mesh shape including unit cells assembled therein, and sides of the unit cells have a curved line shape or a wavy shape.

(11) The touch sensor according to the above (1), wherein the auxiliary electrodes have a mesh shape including unit cells assembled therein, and sides of the unit cells have the same shape or the same spatial frequency as that of the bridge electrode.

(12) The touch sensor according to the above (1), further including an insulation pattern partially covering the bridge electrode, wherein the first sensing electrodes and the second sensing electrodes are disposed on the auxiliary electrodes, the bridge electrode and the insulation pattern.

(13) The touch sensor according to the above (12), wherein the bridge electrode and the auxiliary electrodes include a metal, and the first sensing electrodes and the second sensing electrodes include a multi-layered structure of a transparent conductive oxide layer and a metal layer.

(14) The touch sensor according to the above (1), further including an insulation pattern partially covering the second sensing electrodes, wherein the bridge electrode connects neighboring first sensing electrodes of the first sensing electrodes on the insulation pattern, and the auxiliary electrodes are disposed on the first sensing electrodes and the second sensing electrodes.

(15) The touch sensor according to the above (14), wherein the bridge electrode and the auxiliary electrodes include a metal, and the first sensing electrodes and the second sensing electrodes include a transparent conductive oxide.

(16) A window stack structure, including: a window substrate; and the touch sensor according embodiments as described above stacked on the window substrate.

(17) An image display device, including: a display panel; and the touch sensor according embodiments as described above stacked on the display panel.

A touch sensor according to embodiments of the present invention may include an auxiliary electrode arranged around the bridge electrode. The auxiliary electrode may prevent the bridge electrode from being visually recognized by a user by shifting an optical environment around the bridge electrode to a spatial frequency environment including high frequency components.

In exemplary embodiments, the auxiliary electrode may directly contact a sensing electrode and may serve as a catalyst electrode that promotes a current flow through the bridge electrode. Therefore, a high-sensitivity touch sensing may be provided by reducing a channel resistance.

In exemplary embodiments, the sensing electrodes may include etched regions therein, and an electrode visual recognition of the sensing electrode may be reduced or suppressed by the etched regions. The auxiliary electrode may be disposed to be offset from the etched region in a planar view. Accordingly, improved conductivity may be provided while suppressing a generation of a parasitic capacitance due to the addition of the auxiliary electrode.

DETAILED DESCRIPTION OF THE EMBODIMENTS

According to exemplary embodiments of the present invention, there is provided a touch sensor including sensing electrodes, a bridge electrode and an auxiliary electrode, and having reduced electrode visibility and improved electrical conductivity and sensitivity. Further, a window stack structure and an image display device including the touch sensor are provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

In the accompanying drawings, two directions that are parallel to a top surface of a touch sensor or a base layer 100 and cross each other are defined as a first direction and a second direction. For example, the first direction and the second direction may be perpendicular to each other.

The terms "first", "second", "row direction" and "column direction" used herein are used to relatively designate different elements and directions crossing each other, and not to indicate absolute order and directions.

Figure 1:
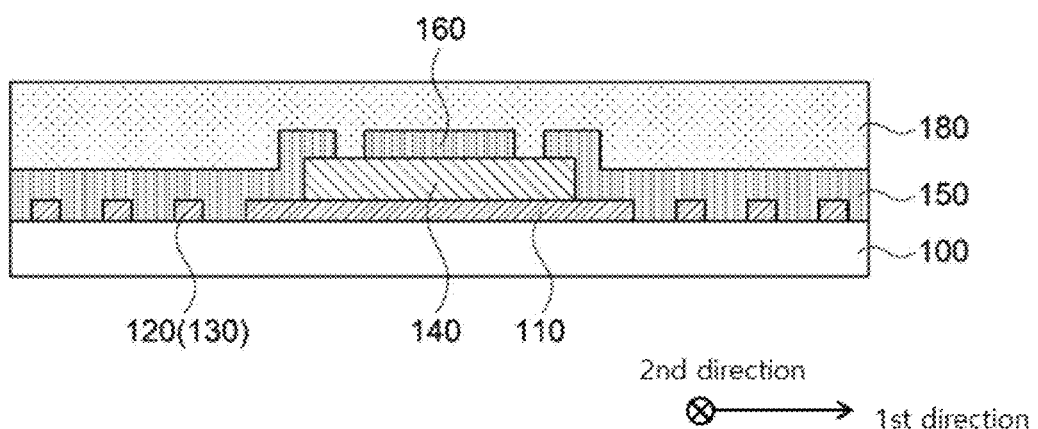
FIG. 1 is a schematic cross-sectional view illustrating a touch sensor in accordance with exemplary embodiments.

FIG. 1 is a schematic cross-sectional view illustrating a touch sensor in accordance with exemplary embodiments. For example, FIG. 1 provides an example of a touch sensor having a bottom bridge construction.

Referring to FIG. 1, the touch sensor may include a bridge electrode 110, auxiliary electrodes 120 and 130, an insulation pattern 140, and sensing electrodes 150 and 160 on a base layer 100.

The base layer 100 may include a supporting layer or a film-type substrate for forming the above-mentioned electrodes. For example, the base layer 100 may include a film material commonly used in a touch sensor. For example, the base layer 100 may include glass, polymer and/or an inorganic insulation material. The polymer may include, e.g., cyclo olefin polymer (COP), polyethylene terephthalate (PET), polyacrylate (PAR), polyether imide (PEI), polyethylene naphthalate (PEN), polyphenylene sulfide (PPS), polyallylate (polyallylate), polyimide (PI), cellulose acetate propionate (CAP), polyether sulfone (PES), cellulose triacetate (TAC), polycarbonate (PC), cyclo olefin copolymer (COC), polymethylmethacrylate (PMMA), etc. The inorganic insulation material may include, e.g., silicon oxide, silicon nitride, silicon oxynitride, a metal oxide, etc.

In some embodiments, a layer or a film member in an image display device to which the touch sensor is applied may also serve as the base layer 100. For example, an encapsulation layer or a passivation layer included in a display panel may serve as the base layer 100.

The bridge electrode 110 may be disposed on the base layer 100. The auxiliary electrodes 120 and 130 may be disposed on the base layer 100 together with the bridge electrode 110.

In exemplary embodiments, the auxiliary electrodes 120 and 130 may be distributed entirely around the bridge electrode 110 and may be physically spaced apart from the bridge electrode 110.

In some embodiments, the bridge electrode 110 and the auxiliary electrodes 120 and 130 may include a metal. For example, the bridge electrode 110 and the auxiliary electrodes 120 and 130 may include silver (Ag), gold (Au), copper (Cu), aluminum (Al), platinum (Pt), palladium (Pd), chromium (Cr), titanium. (Ti), tungsten (W), niobium (Nb), tantalum (Ta), vanadium (V), iron (Fe), manganese (Mn), cobalt (Co), nickel (Ni), zinc (Zn), tin (Sn), molybdenum (Mo), calcium (Ca), or an alloy containing at least two thereof (e.g., silver-palladium-copper (APC) or copper-calcium (CuCa)).

In an embodiment, the bridge electrode 110 and the auxiliary electrodes 120 and 130 may essentially consist of the metal layer. In this case, a current flow may be promoted and a channel resistance may be easily reduced through the bridge electrode 110 and the auxiliary electrodes 120 and 130.

Arrangements and constructions of the bridge electrode 110 and the auxiliary electrodes 120 and 130 will be described later in more detail with reference to FIGS. 2 to 4.

The bridge electrode 110 may be partially covered by the insulation pattern 140. In some embodiments, the insulation pattern 140 may cover a portion except for both end portions (e.g., contact portions) of the bridge electrode 110.

The insulation pattern 140 may include an inorganic insulating material such as silicon oxide or silicon nitride, or an organic insulating material such as an epoxy-based resin, an acrylic resin, a siloxane-based resin, or a polyimide-based resin.

The sensing electrodes 150 and 160 may be disposed on the bridge electrode 110 and the auxiliary electrodes 120 and 130. For example, the sensing electrodes 150 and 160 may be arranged to be operated in a mutual capacitance type.

The first sensing electrodes 150 may be arranged along the first direction (e.g., a row direction or a width direction). Each of the first sensing electrodes 150 may have an independent island pattern shape, and the first sensing electrodes 150 neighboring in the first direction may be electrically connected to each other by the bridge electrode 110. For example, the neighboring first sensing electrodes 150 may be electrically connected to each other through the contact portions of the bridge electrode 110 exposed from the insulation pattern 140.

Accordingly, a first sensing electrode row extending in the first direction may be defined, and a plurality of the first sensing electrode rows may be arranged along the second direction (e.g., a column direction or a length direction).

The second sensing electrodes 160 may be arranged along the second direction. The second sensing electrodes 160 neighboring in the second direction may be connected to each other by a connecting portion 167 (see FIG. 6). The second sensing electrodes 160 and the connecting portion 167 may be integrally connected to each other to be substantially provided as a single member. In this case, the second sensing electrodes 160 and the connecting portion 167 may be formed by the patterning process from the same conductive layer, and may be positioned at the same layer or at the same level.

Accordingly, a second sensing electrode column extending in the second direction may be defined, and a plurality of the second sensing electrode columns may be arranged along the first direction.

In some embodiments, the sensing electrodes 150 and 160 may contact the auxiliary electrodes 120 and 130. Accordingly, a current flow may be promoted through the auxiliary electrodes 120 and 130 to reduce a channel resistance.

Shapes and structure of the sensing electrodes 150 and 160 will be described later in more detail with reference to FIG. 6.

In exemplary embodiments, the sensing electrodes 150 and 160 may include a transparent conductive oxide to have enhanced transmittance. For example, the transparent conductive oxide may include indium tin oxide (ITO), indium zinc oxide (IZO), zinc oxide (ZnO), indium zinc tin oxide (IZTO), cadmium tin oxide (CTO), or the like. These may be used alone or in combination thereof.

In some embodiments, the sensing electrodes 150 and 160 may include a multi-layered structure including a transparent conductive oxide layer and a metal layer. For example, the first electrode layer and the second electrode layer may each have a double-layered structure of a transparent conductive oxide layer-metal layer or a triple-layered structure of a transparent conductive oxide layer-metal layer-transparent conductive oxide layer. In this case, a flexible property may be enhanced by the metal layer and a resistance may be reduced so that a signal transfer speed may be also improved. Further, a resistance to corrosion and a transparency may be enhanced by the transparent conductive oxide layer.

The touch sensor may further include a passivation layer 160 covering the sensing electrodes 150 and 160. The passivation layer may include an organic insulating material such as an epoxy-based resin, an acrylic resin, a siloxane-based resin, a polyimide-based resin, etc., or an inorganic insulating material such as silicon oxide or silicon nitride.

As described above with reference to FIG. 1, the touch sensor may have a bottom bridge structure. Alternatively, the touch sensor may have a top bridge structure.

In this case, the sensing electrodes 150 and 160 may be formed on the base layer 100, and the insulation pattern 140 may be formed to cover the connecting portion 167 included in the second sensing electrode 160. The bridge electrode 110 may electrically connect neighboring first sensing electrodes 150 on the insulation pattern 140, and the auxiliary electrodes 120 and 130 may be distributed around the bridge electrode 110 and disposed on the sensing electrodes 150 and 160.

In the case of the touch sensor having the top bridge structure, the sensing electrodes 150 and 160 may include the above-described transparent conductive oxide, and the bridge electrode 110 and the auxiliary electrodes 120 and 130 may include a metal.

Hereinafter, the electrode structure/arrangement of the touch sensor will be described in more detail based on the touch sensor having the bottom bridge structure.

Figure 2:
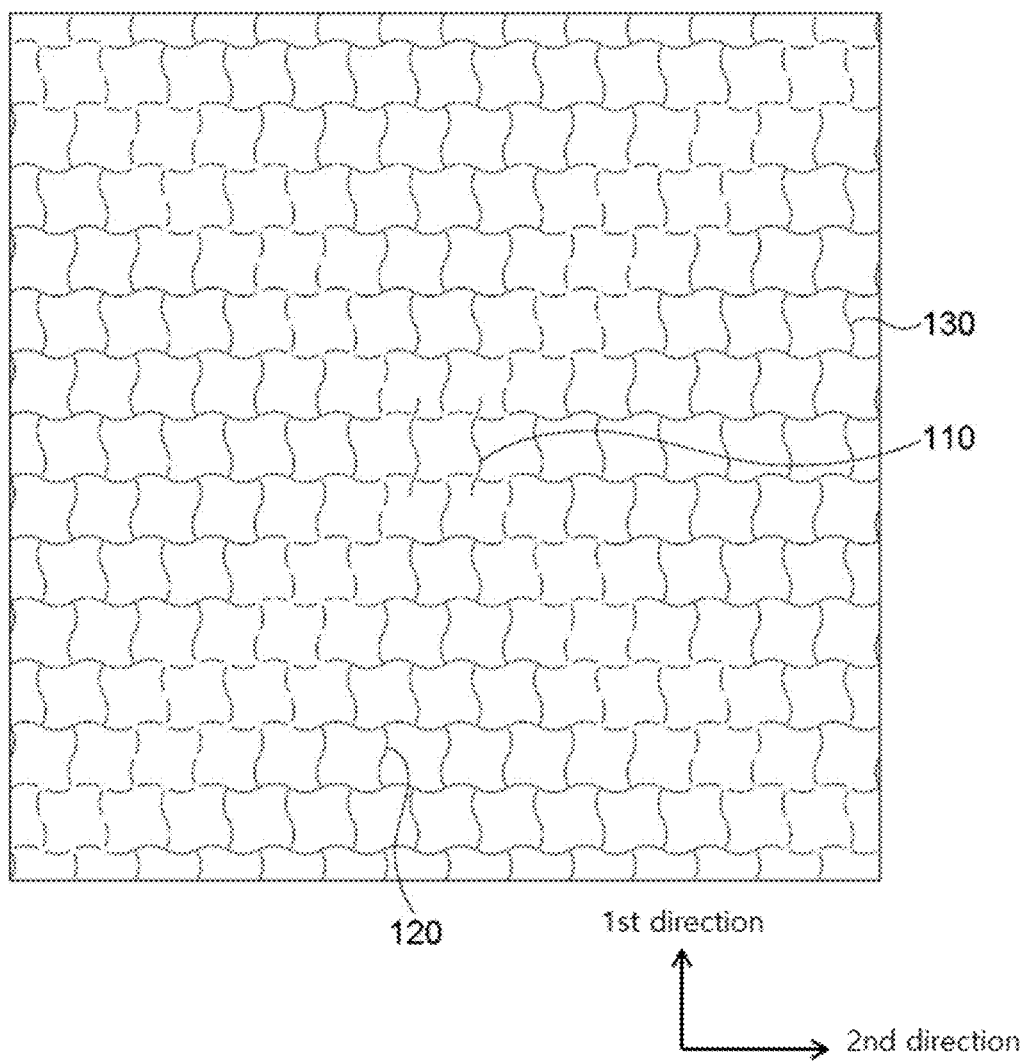
FIGS. 2 to 4 are schematic top planar views illustrating a construction of a bridge electrode and an auxiliary electrode of a touch sensor in accordance with exemplary embodiments.
Figure 3:
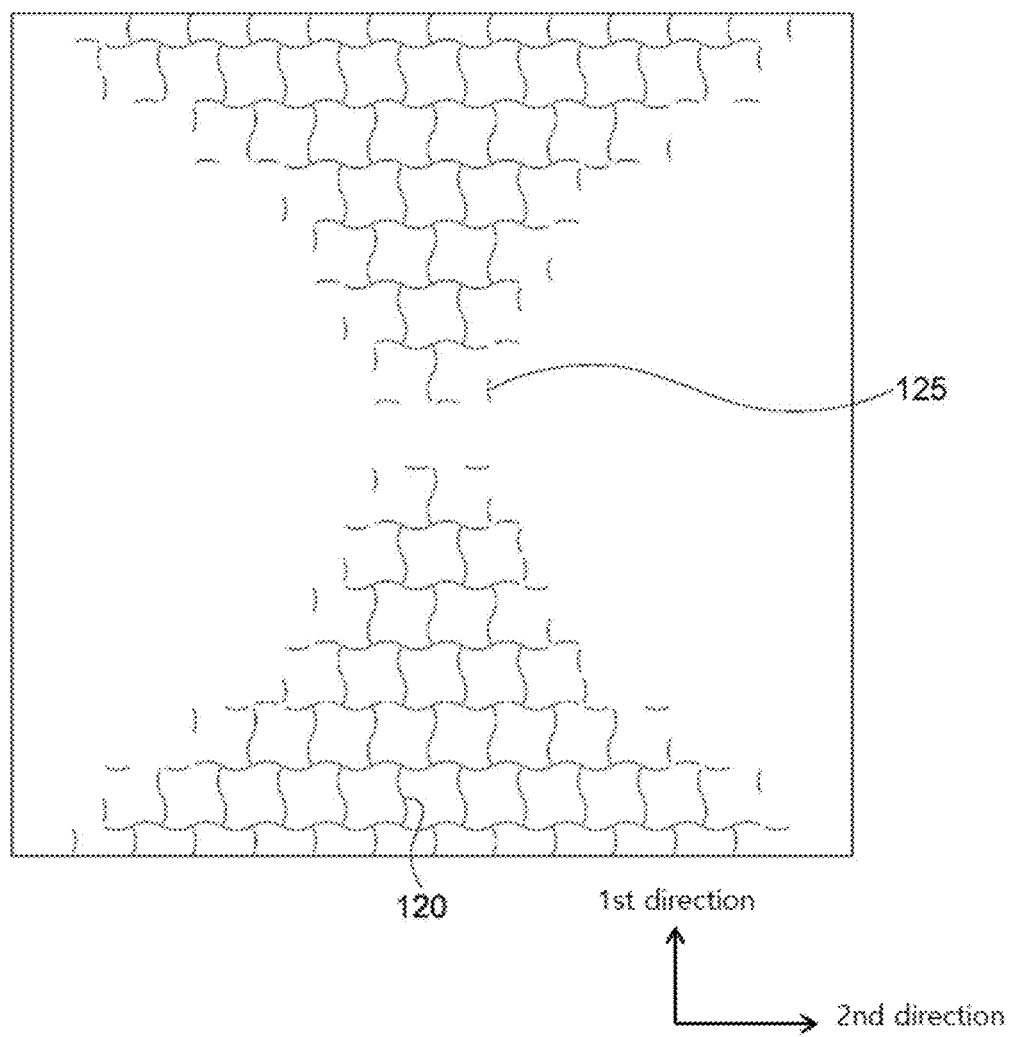
Figure 4:
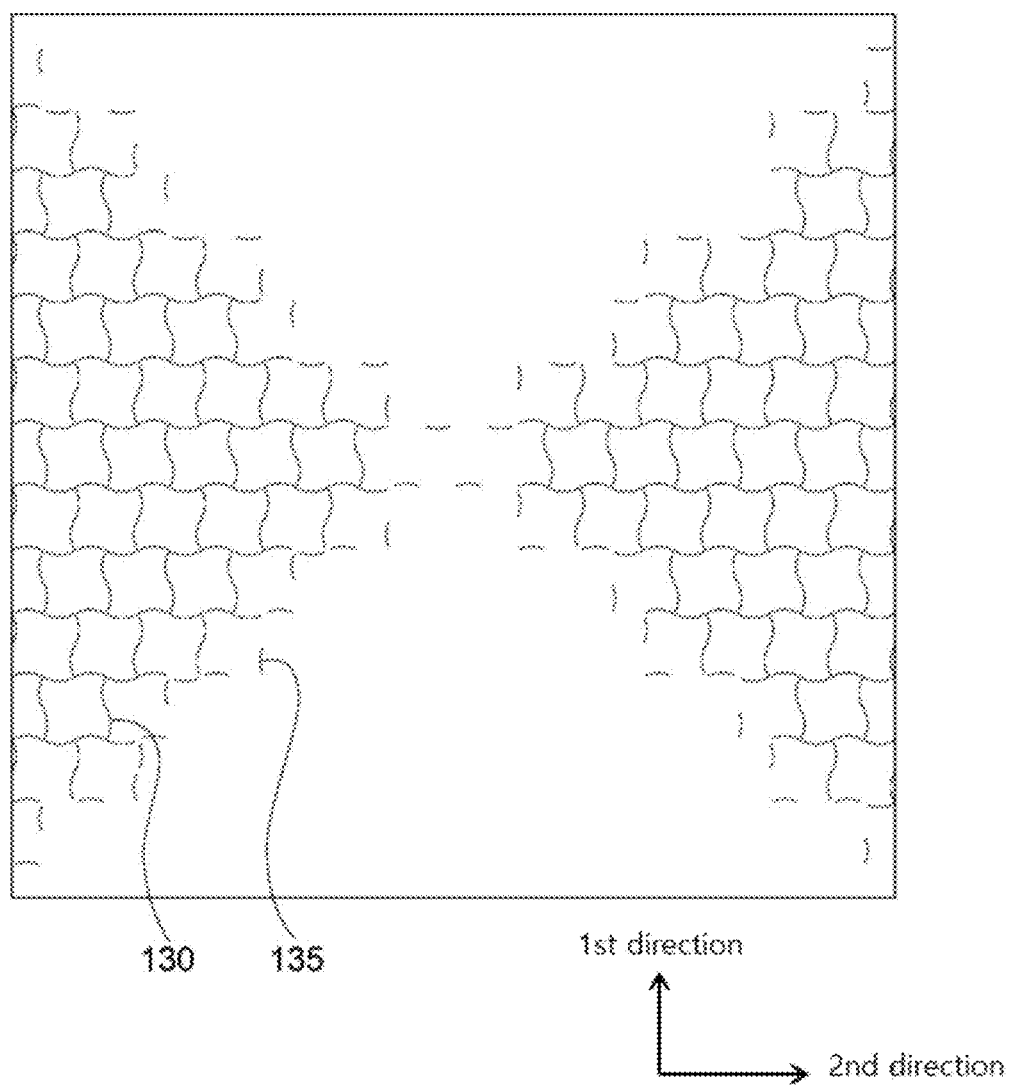

FIGS. 2 to 4 are schematic top planar views illustrating a construction of a bridge electrode and an auxiliary electrode of a touch sensor in accordance with exemplary embodiments. Specifically, FIG. 2 illustrates a bridge electrode and auxiliary electrodes together. FIG. 3 is an individual top planar view of a first auxiliary electrode. FIG. 4 is an individual top planar view of a second auxiliary electrode.

Referring to FIGS. 2 to 4, as described above, the bridge electrode 110 and the auxiliary electrodes 120 and 130 may be formed together on the top surface of the base layer 100.

For example, the bridge electrode 110 may have a wave form of a curved line shape or a wavy shape. The auxiliary electrodes 120 and 130 may surround the bridge electrode 110 and may be physically separated from the bridge electrode 110.

The auxiliary electrodes 120 and 130 may have a mesh shape in which unit cells are assembled. In some embodiments, the unit cells may be arranged in a zigzag shape such that vertices of neighboring unit cells are offset or staggered. Accordingly, an irregularity in the arrangement of the unit cells may be provided, so that a moire phenomenon due to an overlap with pixels included in a display panel under the touch sensor may be reduced.

Each side of the unit cell may have a curved line shape or a wavy shape. In exemplary embodiments, each side of the unit cell may have a shape substantially the same as or similar to that of the bridge electrode 110.

According to exemplary embodiments, sides of the unit cell may be formed to have the same spatial frequency as that of the bridge electrode 110.

The auxiliary electrodes 120 and 130 may include a first auxiliary electrode 120 and a second auxiliary electrode 130. The first auxiliary electrode 120 and the second auxiliary electrode 130 may be electrically and physically separated from each other.

As independently illustrated in FIG. 3, the first auxiliary electrodes 120 may be arranged along the first direction. In exemplary embodiments, a plurality of the first auxiliary electrodes 120 may be arranged to be separated from each other under a region in which the connecting portion 167 of the second sensing electrode 160 may be disposed. Accordingly, the first auxiliary electrodes 120 may be arranged along the extending direction of the first sensing electrode row.

As independently illustrated in FIG. 4, the second auxiliary electrodes 130 may be arranged along the second direction. In exemplary embodiments, a plurality of the second auxiliary electrodes 130 may be arranged to be separated from each other around an area where the bridge electrode 110 is disposed. Accordingly, the second auxiliary electrodes 130 may be arranged along an extending direction of the second sensing electrode column.

As illustrated in FIGS. 3 and 4, separation electrodes 125 and 135 having a fragment shape of one side of the unit cell may be arranged for a mutual separation between the first and second auxiliary electrodes 120 and 130 around peripheries of the auxiliary electrodes 120 and 130.

For example, first separation electrodes 125 may be arranged around the periphery of the first auxiliary electrode 120. Second separation electrodes 135 may be arranged around the periphery of the second auxiliary electrode 130.

As described above, the auxiliary electrodes 120 and 130 including sides of a spatial frequency or a shape substantially the same or similar to that of the bridge electrode 110 may be disposed around the bridge electrode 110 including metal. Accordingly, a circumference environment of the bridge electrode 110 may be filled with high-frequency components, and may be shifted to a spatial frequency range that may not be visually recognized to a user. Accordingly, an electrode visual recognition due to the bridge electrode 110 may be reduced or suppressed.

Figure 5:
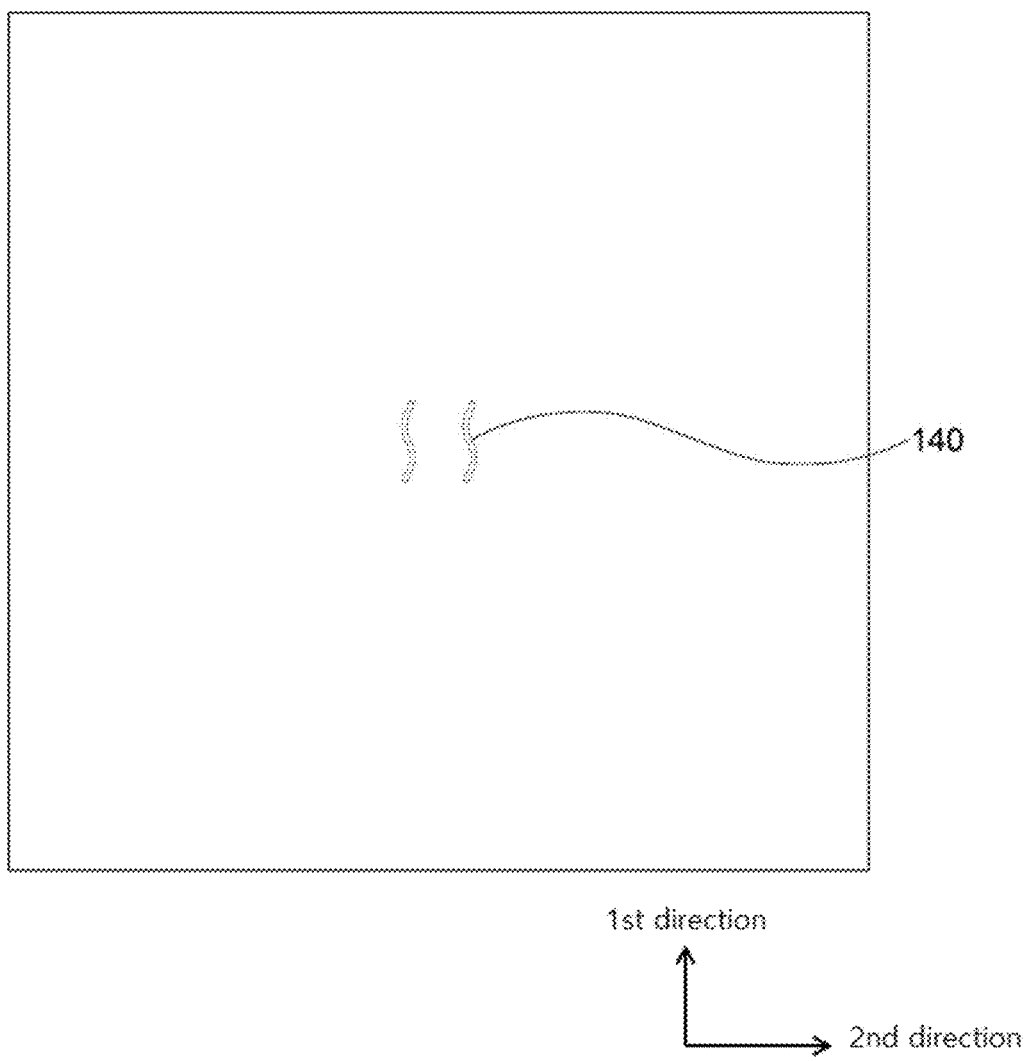
FIG. 5 is a schematic top planar view illustrating an insulation pattern of a touch sensor in accordance with exemplary embodiments.

FIG. 5 is a schematic top planar view illustrating an insulation pattern of a touch sensor in accordance with exemplary embodiments.

Referring to FIG. 5, the insulation pattern 140 may have a shape substantially the same as or similar to that of the bridge electrode 110. For example, the insulation pattern 140 may also have a curved line shape or a wavy shape.

As described above, the insulation pattern 140 may expose both ends of the bridge electrode 110 and cover the bridge electrode 110.

Figure 6:
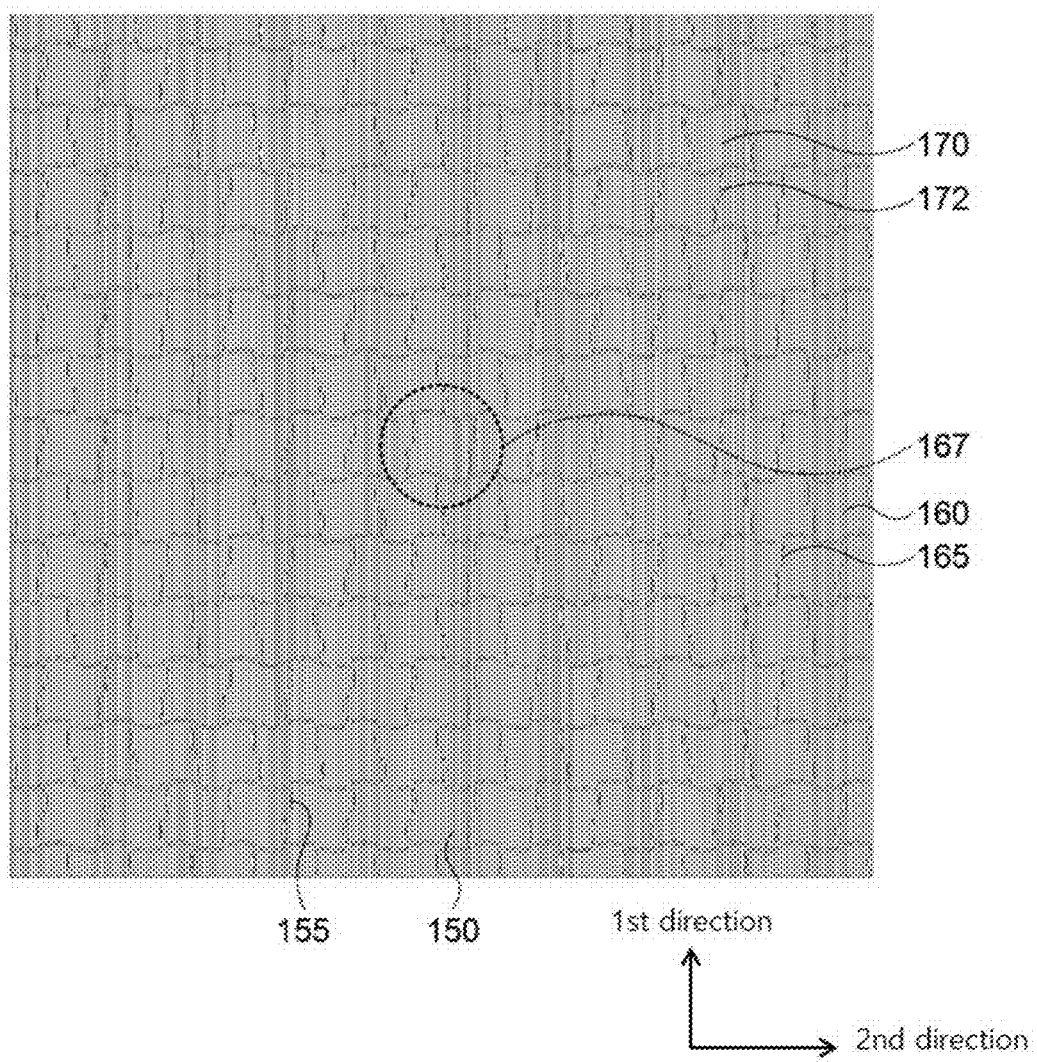
FIG. 6 is a schematic top planar view illustrating a construction of sensing electrodes of a touch sensor in accordance with exemplary embodiments.

FIG. 6 is a schematic top planar view illustrating a construction of sensing electrodes of a touch sensor in accordance with exemplary embodiments.

Referring to FIG. 6, as described with reference to FIG. 1, the touch sensor may include the first sensing electrodes 150 and the second sensing electrodes 160. The second sensing electrodes 160 may be integrally connected to each other by the connecting portion 167 along the second direction. The first sensing electrodes 150 may be arranged to be spaced apart from each other in the first direction.

In exemplary embodiments, etched regions 155 and 165 may be formed at an inside of the sensing electrodes 150 and 160. First etched regions 155 may be formed at an inside of the first sensing electrode 150, and second etching regions 165 may be formed at an inside of the second sensing electrode 160.

The term "etched region" used in the present application may refer to a region or a space that is removed by etching an inside of a conductive layer or a conductive pattern in a predetermined shape. In exemplary embodiments, the etched region may have a shape such as a slit, a hole or an opening.

In some embodiments, the etched regions 155 and 165 may be formed as slits having a bent or curved line shape. The curved line shape of the etched regions 155 and 165 may include a sine curve, a cosine curve, a conic section, a catenary, a curve of pursuit, a cycloid, a trochoid, a cardioid, or the like.

The etched regions 155 and 165 may be regularly and repeatedly arranged. For example, the etched regions 155 and 165 may be arranged along sides of an imaginary rectangle (e.g., an imaginary square).

As illustrated in FIG. 6, the etched regions 155 and 165 may have a shape in which a water wave corresponding to one period is segmented between vertices of the imaginary square. In an embodiment, the imaginary squares may be arranged in a zigzag shape so that the vertices are offset or staggered.

Dummy patterns 170 may be formed between the first sensing electrode 150 and the second sensing electrode 160 neighboring each other. The dummy pattern 170 may be defined by a separation region 172 extending along peripheries of the first sensing electrode 150 and the second sensing electrode 160. The separation region 172 may have a waveform substantially the same as or similar to that of the first and second etched regions 155 and 165. Accordingly, the dummy pattern 170 may have a shape substantially the same as or similar to a shape of a conductive pattern at the inside of the sensing electrodes 150 and 160 (e.g., a quadrangle having four sides that are transformed into a water wave).

Additionally, the shape of the conductive pattern at the inside of the sensing electrodes 150 and 160 may be similar to the shape of the unit cell (see FIGS. 2 and 3) included in the auxiliary electrodes 120 and 130. Accordingly, uniformity of an electrode structure in the touch sensor may be improved, so that an electrode visual recognition due to a local deviation of a pattern shape may be prevented.

According to the above-described exemplary embodiments, the etched regions 155 and 165 may be formed at the inside of each of the sensing electrodes 150 and 160. Accordingly, a moire phenomenon caused by a regular overlap of the sensing electrodes 150 and 160 with a pixel structure included in a display panel may be prevented or reduced. For example, a spatial frequency generated by an overlap between the sensing electrodes 150 and 160 and the pixel structure may be suppressed or canceled by the etched regions 155 and 165.

Further, the etched regions 155 and 165 may serve as light slits, so that the moire phenomenon may be more effectively suppressed by a light diffraction or scattering, and the sensing electrodes 150 and 160 may be prevented from being visually recognized by the user.

Figure 7:
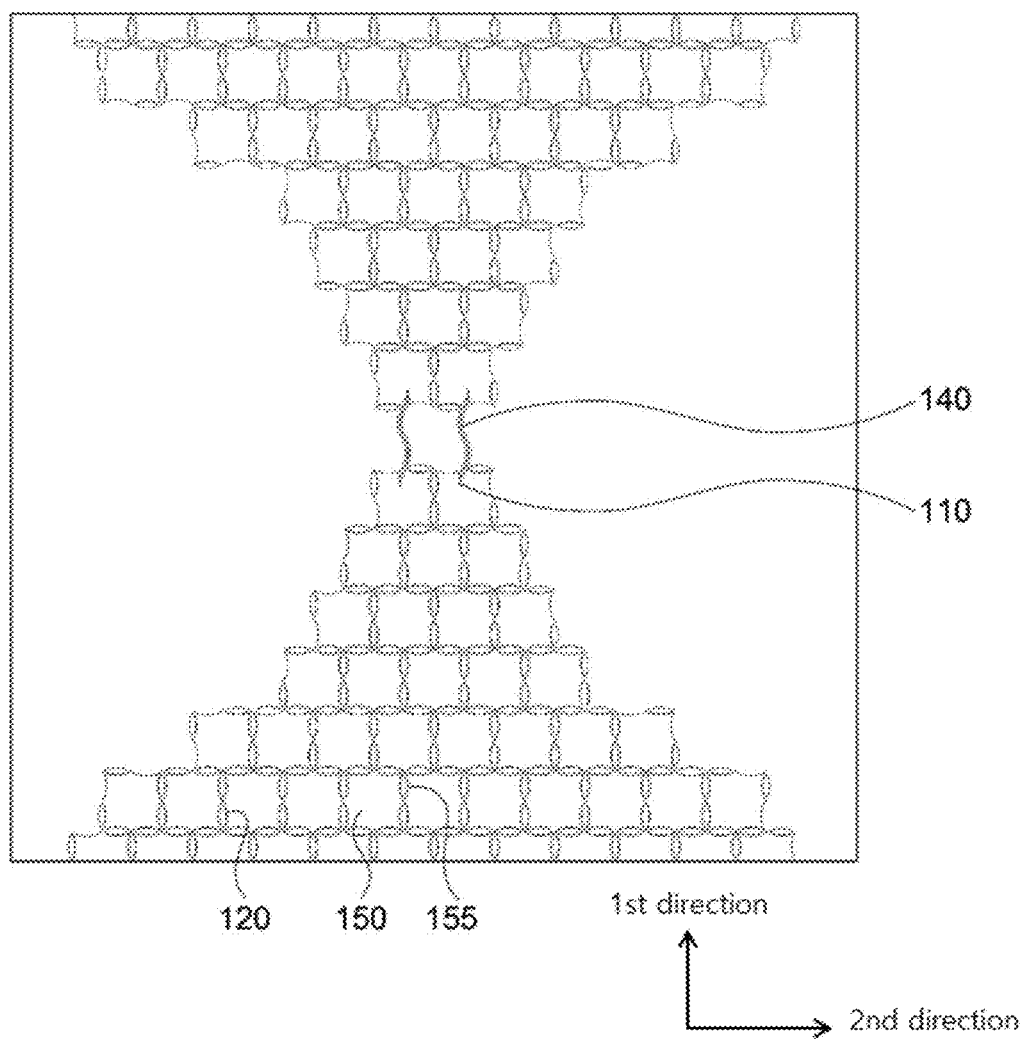
FIG. 7 is a schematic top planar view illustrating an arrangement of a first electrode, a first auxiliary electrode and a bridge electrode in accordance with exemplary embodiments.

FIG. 7 is a schematic top planar view illustrating an arrangement of a first electrode, a first auxiliary electrode and a bridge electrode in accordance with exemplary embodiments.

Referring to FIG. 7, the first sensing electrode 150 may be superimposed over the first auxiliary electrode 120 in a planar view. In exemplary embodiments, the first sensing electrode 150 may contact the first auxiliary electrode 120. Accordingly, the first auxiliary electrode 120 may promote a current flow through the first sensing electrode 150, and may serve as a catalyst electrode that may concentrate or promote a current flow through the bridge electrode 110.

In some embodiments, each side of the unit cell included in the first auxiliary electrode 120 may not overlap the first etched region 155 included in the first sensing electrode 150 in the planar view. For example, each side of the unit cell included in the first auxiliary electrode 120 may be offset with or symmetrical to the first etched region 155. The first auxiliary electrode 120 may be arranged to avoid the first etched region 155, so that a parasitic capacitance by an addition of the first auxiliary electrode 120 may be prevented without degrading an optical slit effect of the first etched region 155.

Figure 8:
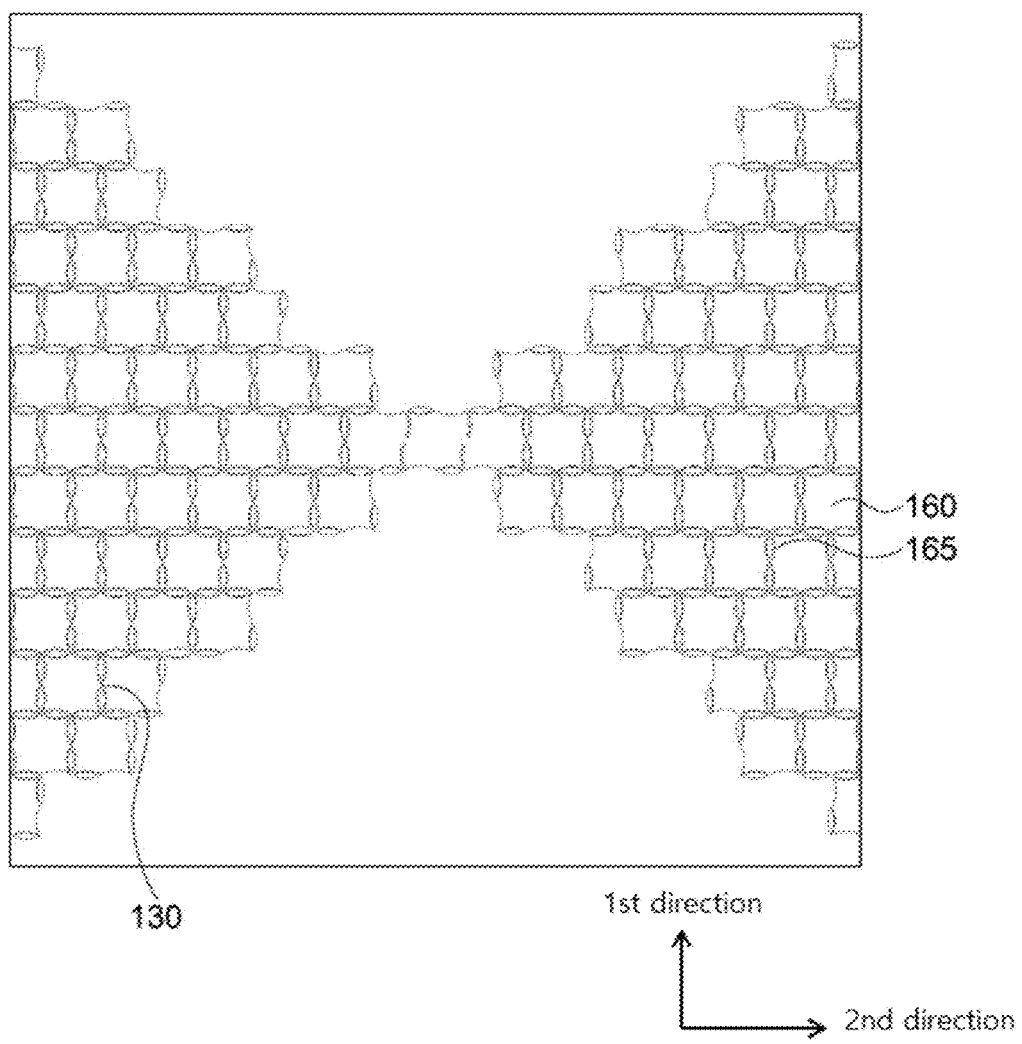
FIG. 8 is a schematic top planar view illustrating an arrangement of a second electrode and a second auxiliary electrode in accordance with exemplary embodiments.

FIG. 8 is a schematic top planar view illustrating an arrangement of a second electrode and a second auxiliary electrode in accordance with exemplary embodiments.

Referring to FIG. 8, the second sensing electrode 160 may be superimposed over the second auxiliary electrode 130 in a planar view. In exemplary embodiments, the second sensing electrode 160 may contact the second auxiliary electrode 130. Accordingly, the second auxiliary electrode 130 may serve as a catalyst electrode that may promote a current flow through the second sensing electrode 160.

In some embodiments, each side of the unit cell included in the second auxiliary electrode 130 may not overlap the second etched region 165 included in the second sensing electrode 160 in the planar view. For example, each side of the unit cell included in the second auxiliary electrode 130 may be offset with or symmetrical to the second etched region 165. The second auxiliary electrode 130 may be arranged to avoid the second etched region 165, so that a parasitic capacitance by an addition of the second auxiliary electrode 130 may be prevented without degrading an optical slit effect of the second etched region 165.

Figure 9:
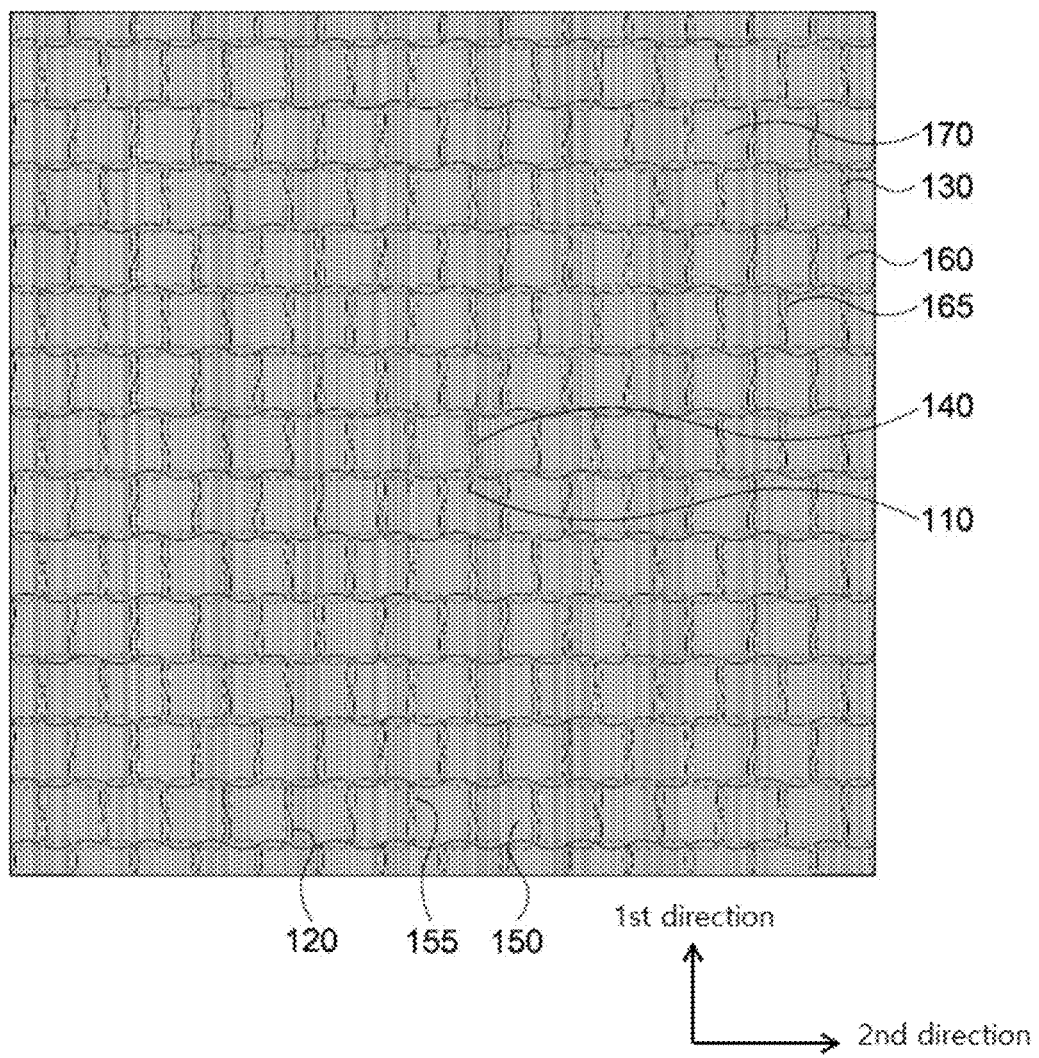
FIG. 9 is a schematic top planar view illustrating a touch sensor in accordance with exemplary embodiments.

FIG. 9 is a schematic top planar view illustrating a touch sensor in accordance with exemplary embodiments. Specifically, FIG. 9 is a top planer view in which the bridge electrode 110, the auxiliary electrodes 120 and 130 and the sensing electrodes 150 and 160 are projected together on the same plane.

Referring to FIG. 9, as described above, the auxiliary electrodes 120 and 130 may contact the sensing electrodes 150 and 160 around the bridge electrode 110, and may be arranged to deviate from the etched regions 155 and 165.

Accordingly, the arrangement of the conductive patterns in the planar view of the touch sensor may be entirely converted into high-frequency components that may not be recognized by the user, so that the electrode visual recognition may be effectively suppressed.

Figure 10:
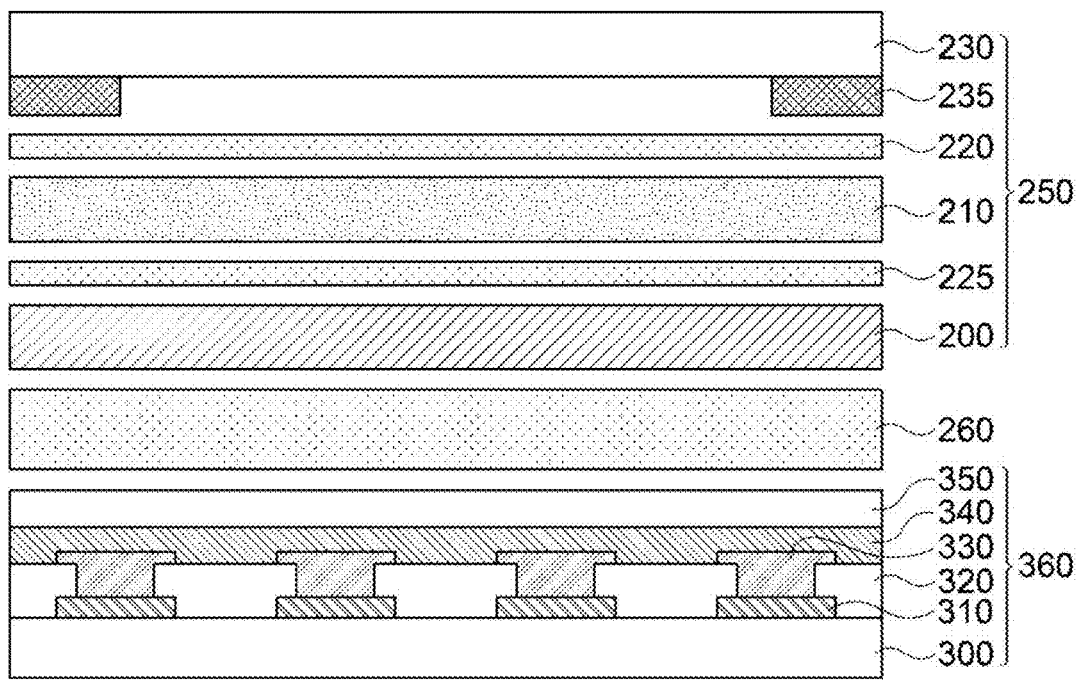
FIG. 10 is a schematic cross-sectional view illustrating a window stack structure and an image display device in accordance with exemplary embodiments.

FIG. 10 is a schematic cross-sectional view illustrating a window stack structure and an image display device in accordance with exemplary embodiments.

Referring to FIG. 10, a window stack structure 250 may include a window substrate 230, a polarizing layer 210 and a touch sensor 200 according to exemplary embodiments as described above.

The window substrate 230 may include, e.g., a hard coating film. In an embodiment, a light-shielding pattern 235 may be formed on a peripheral portion of a surface of the window substrate 230. The light-shielding pattern 235 may include a color-printed pattern, and may have a single-layered or multi-layered structure. A bezel portion or a non-display region of the image display device may be defined by the light-shielding pattern 235.

The polarizing layer 210 may include a coating-type polarizer or a polarizing plate. The coating-type polarizer may include a liquid crystal coating layer that may include a cross-linkable liquid crystal compound and a dichroic dye. In this case, the polarizing layer 210 may include an alignment layer for providing an orientation of the liquid crystal coating layer.

For example, the polarizing plate may include a polyvinyl alcohol-based polarizer and a protective film attached to at least one surface of the polyvinyl alcohol-based polarizer.

The polarizing layer 210 may be directly attached to the surface of the window substrate 230 or may be attached via a first adhesive layer 220.

The touch sensor 200 may be included in the window stack structure 250 as a film or a panel. In an embodiment, the touch sensor 200 may be combined with the polarizing layer 210 via a second adhesive layer 225.

As illustrated in FIG. 10, the window substrate 230, the polarizing layer 210 and the touch sensor 200 may be sequentially positioned from a viewer's side. In this case, the sensing electrodes of the touch sensor 200 may be disposed under the polarizing layer 210 so that electrode patterns may be effectively prevented from being recognized by the viewer.

If the touch sensor 200 includes a substrate, the substrate may include, e.g., triacetyl cellulose, cycloolefin, cycloolefin copolymer, polynorbornene copolymer, or the like, and preferably, may have an in-plane retardation value of ±2.5 nm or less.

In an embodiment, the touch sensor 200 may be directly transferred to the window substrate 230 or the polarizing layer 210. In an embodiment, the window substrate 230, the touch sensor 200 and the polarizing layer 210 may be sequentially positioned from the viewer's side.

The image display device may include a display panel 360 and the window stack structure 250 disposed on the display panel 360.

The display panel 360 may include a pixel electrode 310, a pixel defining layer 320, a display layer 330, an opposing electrode 340 and an encapsulation layer 350 disposed on a panel substrate 300.

A pixel circuit including a thin film transistor (TFT) may be formed on the panel substrate 300, and insulation layer covering the pixel circuit may be formed. The pixel electrode 310 may be electrically connected to, e.g., a drain electrode of the TFT on the insulation layer.

The pixel defining layer 320 may be formed on the insulation layer, and the pixel electrode 310 may be exposed through the pixel defining layer 320 such that a pixel region may be defined. The display layer 330 may be formed on the pixel electrode 310, and the display layer 330 may include, e.g., a liquid crystal layer or an organic light emitting layer.

The opposing electrode 340 may be disposed on the pixel defining layer 320 and the display layer 330. The opposing electrode 340 may serve as, e.g., a common electrode or a cathode of the image display device. The encapsulation layer 350 may be disposed on the opposing electrode 340 to protect the display panel 360.

In some embodiments, the display panel 360 and the window stack structure 250 may be combined with each other through an adhesive layer 260. For example, a thickness of the adhesive layer 260 may be greater than each thickness of the first adhesive layer 220 and the second adhesive layer 225. A viscoelasticity of the adhesive layer 260 may be about 0.2 MPa or less at a temperature ranging from −20° C. to 80° C. In this case, a noise from the display panel 360 may be blocked, and an interface stress while being bent may be alleviated so that damages of the window stack structure 250 may be avoided. In an embodiment, the viscoelasticity of the adhesive layer 260 may be in a range from about 0.01 MPa to about 0.15 MPa.

The touch sensor 200 may include a construction of the auxiliary electrodes and the sensing electrodes according to exemplary embodiments as described above, so that improved touch sensitivity may be implemented while preventing a degradation of an image quality from the display panel 360.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Example

A metal film (a copper alloy film) was patterned on a COP substrate to form bridge electrodes and auxiliary electrodes including wave-shaped lines as illustrated in FIG. 2. The bridge electrode and the auxiliary electrode had a line width of 4 μm and a thickness of 2300 Å.

Thereafter, an acrylic insulation pattern partially covering the bridge electrode was formed, and an ITO layer was deposited and patterned to form first and second sensing electrodes (thickness: 1300 Å) to have the shapes illustrated in FIGS. 6 and 9. Each line width of etched regions formed in the sensing electrodes was 10 μm.

Comparative Example

A touch sensor was fabricated by a method the same as that in Example except that the auxiliary electrodes were omitted.

A current was applied to each touch sensor of Example and Comparative Example to measure a parasitic capacitance, a resistance of the first sensing electrode and a resistance of the second sensing electrode. The results are shown in Table 1 below.

TABLE 1

|  | Parasitic Capacitance (pF) | Resistance of first sensing electrode (Ω) | Resistance of second sensing electrode (Ω) |
| --- | --- | --- | --- |
| Example | 0.85 | 30.5 | 44.0 |
| Comparative Example | 0.84 | 58.8 | 78.5 |

Referring to Table. 1, an increase of the parasitic capacitance due to an addition of the auxiliary electrode was substantially suppressed while remarkably reducing the resistance of the sensing electrodes.

Although the exemplary embodiments of the present invention have been disclosed for illustrative purposes, those skilled in the art will appreciate that various modifications, ions and substitutions are possible, without departing from the scope and spirit of the invention as disclosed in the accompanying claims.

What is claimed is:

1. A touch sensor, comprising:
a base layer;
a bridge electrode disposed on a top surface of the base layer;
auxiliary electrodes disposed around the bridge electrode and located at the same level as that of the bridge electrode to be physically spaced apart from the bridge electrode;
first sensing electrodes electrically connected to each other via the bridge electrode, the first sensing electrodes having an independent island pattern shape;
second sensing electrodes electrically separated from the first sensing electrodes and arranged in a direction different from an arrangement direction of the first sensing electrodes;
a connecting portion integrally connected with the second sensing electrodes; and
an insulation pattern partially covering the bridge electrode,
wherein the first sensing electrodes and the second sensing electrodes are disposed on the auxiliary electrodes, the bridge electrode and the insulation pattern.

2. The touch sensor of claim 1, wherein the auxiliary electrodes comprise first auxiliary electrodes and second auxiliary electrodes; and
the first sensing electrodes are superimposed over the first auxiliary electrodes and the second sensing electrodes are superimposed over the second auxiliary electrodes in a planar view.

3. The touch sensor of claim 2, wherein the first sensing electrodes include first etched regions therein, and the second sensing electrodes include second etched regions therein.

4. The touch sensor of claim 3, wherein the auxiliary electrodes have a mesh shape including unit cells assembled therein.

5. The touch sensor of claim 4, wherein the unit cells of the first auxiliary electrodes are arranged to be offset from the first etched regions in the planar view, and the unit cells of the second auxiliary electrodes are arranged to be offset from the second etched regions in the planar view.

6. The touch sensor of claim 4, further comprising separation electrodes arranged between the first auxiliary electrode and the second auxiliary electrode neighboring each other.

7. The touch sensor of claim 6, wherein each of the separation electrodes has a fragmented shape from one side of each of the unit cells.

8. The touch sensor of claim 2, wherein the first auxiliary electrodes physically contact the first sensing electrodes, and the second auxiliary electrodes physically contact the second sensing electrodes.

9. The touch sensor of claim 1, wherein the bridge electrode has a curved line shape or a wavy shape.

10. The touch sensor of claim 9, wherein the auxiliary electrodes have a mesh shape including unit cells assembled therein, and sides of the unit cells have a curved line shape or a wavy shape.

11. The touch sensor of claim 1, wherein the auxiliary electrodes have a mesh shape including unit cells assembled therein, and sides of the unit cells have the same shape or the same spatial frequency as that of the bridge electrode.

12. The touch sensor of claim 1, wherein the bridge electrode and the auxiliary electrodes include a metal, and the first sensing electrodes and the second sensing electrodes include a multi-layered structure of a transparent conductive oxide layer and a metal layer.

13. A window stack structure, comprising:
a window substrate; and
the touch sensor of claim 1 stacked on the window substrate.

14. An image display device, comprising:
a display panel; and
the touch sensor of claim 1 stacked on the display panel.

15. A touch sensor, comprising:
a base layer;
a bridge electrode disposed on a top surface of the base layer;
auxiliary electrodes disposed around the bridge electrode to be physically spaced apart from the bridge electrode;
first sensing electrodes electrically connected to each other via the bridge electrode;
second sensing electrodes electrically separated from the first sensing electrodes and arranged in a direction different from an arrangement direction of the first sensing electrodes; and
an insulation pattern partially covering the bridge electrode,
wherein the first sensing electrodes and the second sensing electrodes are disposed on the auxiliary electrodes, the bridge electrode and the insulation pattern.

16. The touch sensor of claim 15, wherein the bridge electrode and the auxiliary electrodes include a metal, and the first sensing electrodes and the second sensing electrodes include a multi-layered structure of a transparent conductive oxide layer and a metal layer.

\* \* \* \* \*